United States Patent
Greenwood

(10) Patent No.: US 11,958,521 B2
(45) Date of Patent: Apr. 16, 2024

(54) ACCESSORY CONNECTOR

(71) Applicant: YouCopia Products, Inc., Chicago, IL (US)

(72) Inventor: Mark Greenwood, Evanston, IL (US)

(73) Assignee: YouCopia Products, Inc., Chicago, IL (US)

( * ) Notice: Subject to any disclaimer, the term of this patent is extended or adjusted under 35 U.S.C. 154(b) by 515 days.

(21) Appl. No.: 17/011,122

(22) Filed: Sep. 3, 2020

(65) Prior Publication Data
US 2022/0063692 A1    Mar. 3, 2022

(51) Int. Cl.
*B62B 3/10*    (2006.01)
*B62B 3/04*    (2006.01)

(52) U.S. Cl.
CPC ............ *B62B 3/104* (2013.01); *B62B 3/04* (2013.01); *B62B 2202/025* (2013.01)

(58) Field of Classification Search
CPC ..... B62B 3/104; B62B 3/04; B62B 2202/025; B62B 2202/00; B62B 3/10
See application file for complete search history.

(56) References Cited

U.S. PATENT DOCUMENTS

| | | | | |
|---|---|---|---|---|
| 4,557,452 A * | 12/1985 | Khuong | ............. | A47G 23/0225 248/214 |
| 5,738,319 A * | 4/1998 | Grassi | ............. | A47G 7/044 248/215 |
| 6,079,686 A * | 6/2000 | Reed | ............. | A47G 7/044 248/312.1 |
| 8,371,473 B2 * | 2/2013 | Scribner | ............. | A01K 7/027 47/65.5 |
| 9,870,724 B1 * | 1/2018 | Van Gorp | ............. | G09F 3/0288 |
| 2004/0035049 A1 * | 2/2004 | McLarty | ............. | A47G 7/044 47/39 |
| 2005/0193625 A1 * | 9/2005 | Rosser | ............. | A47H 27/00 47/68 |
| 2007/0102893 A1 * | 5/2007 | Mayo | ............. | B62B 3/10 280/79.11 |
| 2012/0145758 A1 * | 6/2012 | Taylor | ............. | B62B 3/1472 224/411 |
| 2012/0228293 A1 * | 9/2012 | Combs | ............. | A45F 5/02 220/660 |
| 2013/0277375 A1 * | 10/2013 | Hickox | ............. | A47G 23/06 220/575 |
| 2015/0041537 A1 * | 2/2015 | Gentile | ............. | G06K 7/08 235/385 |

(Continued)

FOREIGN PATENT DOCUMENTS

| | | | | |
|---|---|---|---|---|
| DE | 3506407 A1 * | 8/1986 | | |
| FR | 2785765 A1 * | 5/2000 | ............. | A01G 9/022 |

(Continued)

*Primary Examiner* — James A Shriver, II
*Assistant Examiner* — Michael T. Walsh
(74) *Attorney, Agent, or Firm* — Lowe Graham Jones, PLLC

(57) ABSTRACT

An accessory connector includes a disk having an upper end and a lower end, a front side and a back side. A hook is positioned at the upper end of the back side of the disk, and a foot is positioned at the lower end of the back side of the disk, and extending laterally away from the disk. An accessory is positioned on the front side of the disk, so that the accessory can be attached to a cart by attaching the accessory connector to the cart.

15 Claims, 24 Drawing Sheets

(56) References Cited

U.S. PATENT DOCUMENTS

| | | | | |
|---|---|---|---|---|
| 2016/0066767 | A1* | 3/2016 | Villasenor | A47L 19/04 |
| | | | | 220/601 |
| 2016/0331129 | A1* | 11/2016 | VanHeusden | A47B 96/022 |
| 2017/0174239 | A1* | 6/2017 | Bacallao | B62B 3/106 |
| 2017/0174241 | A1* | 6/2017 | Bacallao | B62B 3/106 |
| 2018/0108279 | A1* | 4/2018 | Balser | G09F 3/201 |
| 2019/0111956 | A1* | 4/2019 | Phillips | B62B 3/10 |
| 2019/0266924 | A1* | 8/2019 | Culhane | G09F 3/202 |
| 2019/0282003 | A1* | 9/2019 | Otchere | A01G 9/02 |
| 2020/0039553 | A1* | 2/2020 | Abohammdan | B62B 5/061 |
| 2020/0124230 | A1* | 4/2020 | Hoffman | F16M 13/02 |
| 2021/0310508 | A1* | 10/2021 | Runge | F16B 45/008 |
| 2022/0126899 | A1* | 4/2022 | Moore | B62B 3/02 |

FOREIGN PATENT DOCUMENTS

| | | | | |
|---|---|---|---|---|
| FR | 2799628 A1 * | 4/2001 | | A47G 7/044 |
| FR | 2838319 A3 * | 10/2003 | | A47G 7/044 |

* cited by examiner

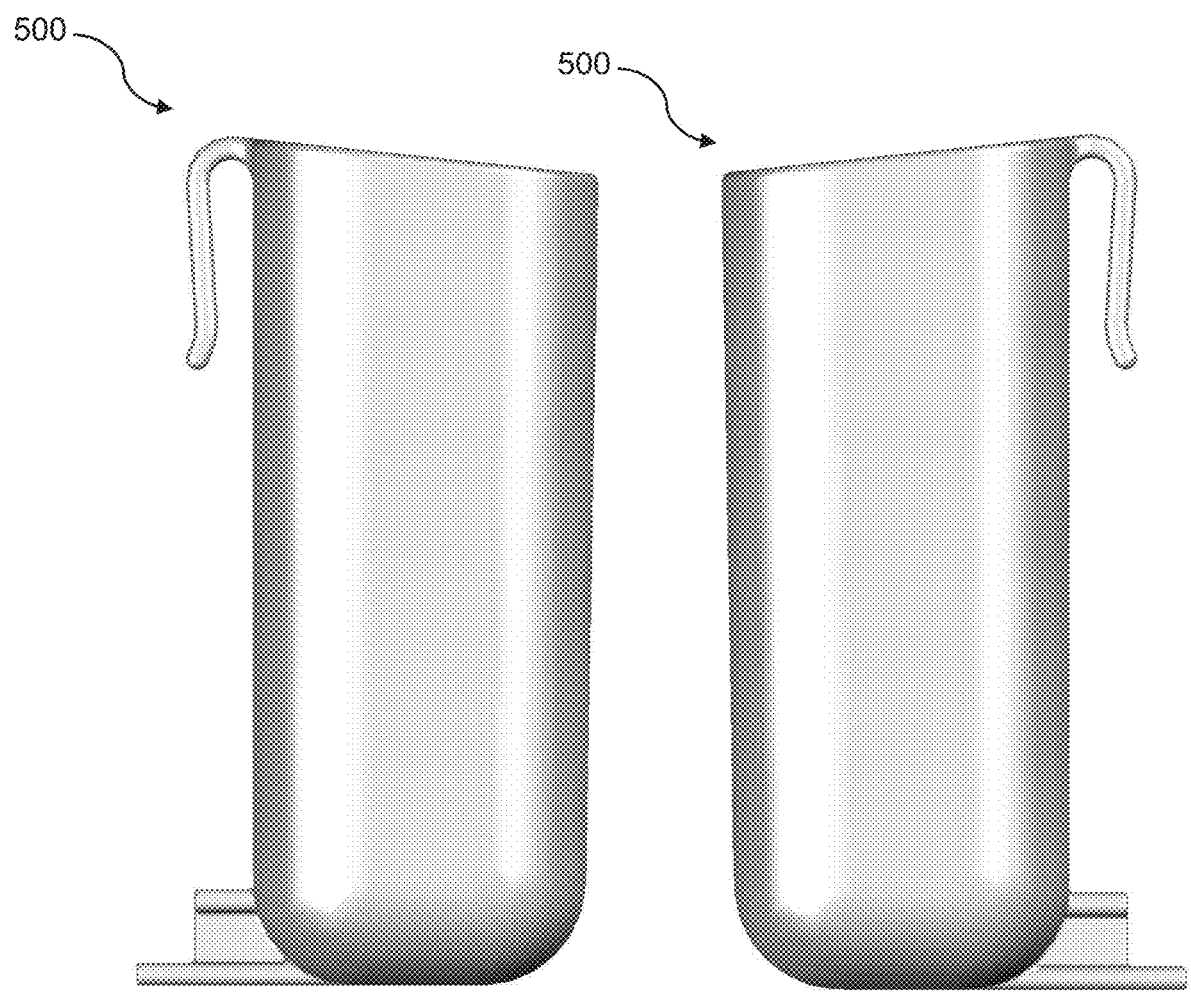

ACCESSORY CONNECTOR

BACKGROUND OF THE INVENTION

It can be useful to have a cart for holding and portably carrying a variety of household items such as cleaning supplies, food items, or office supplies. In some instances, it may be desirable to attach further accessories to the cart, such as by hanging or attaching them to an outer surface of the cart. The location for attachment may be beneficial, but there is no convenient and effective way to removably attach a variety of objects to such a cart.

SUMMARY OF THE INVENTION

An accessory connector preferably includes a disk having an upper end and a lower end, a front side and a back side. A hook is positioned at the upper end of the back side of the disk, and a foot is positioned at the lower end of the back side of the disk, and extending laterally away from the disk. An accessory is positioned on the front side of the disk, so that the accessory can be attached to a cart by attaching the accessory connector to the cart.

In some versions, the foot comprises an upper tab and a lower tab, the upper tab extending away from the disk for a first distance and the lower tab extending away from the disk for a second distance, the second distance being greater than the first distance.

The particular accessories may vary, but in some versions the accessory comprises a roll holder, one or more accessory hooks, a bin, or a tag plate.

In some examples, the hook comprises a plurality of hooks.

The accessories, via the accessory connector, may be attached to a cart in which the cart has a base and a sidewall extending upward to a rim, a corner (which may be rounded) being formed at the intersection of the base and the sidewall, so that the accessory connector is removably attachable to the cart by connecting the hook to the rim and coupling the foot to the corner.

In some examples, the sidewall of the cart includes an inner surface and an outer surface, the accessory connector being removably attachable to the outer surface whereby when the accessory connector is attached to the cart, the disk is in contact with the outer surface of the sidewall.

In additional versions, the accessory connector is fashioned for attaching an accessory to a container and includes a hook positioned at an upper end of the accessory connector and extending laterally away from the accessory connector in a first direction. A foot is positioned at a lower end of the accessory connector and extending laterally away from the accessory connector in the first direction. A substantially planar surface extends between the hook and the foot, with an accessory attached to the accessory connector so that it extends away from the accessory connector in a second direction opposite to the first direction.

In preferred versions, the container has a base and a sidewall joining at a corner, the sidewall extending upwardly from the base and terminating in a rim, wherein the accessory connector is removably attachable to the container by connecting the hook to the rim and connecting the foot to the corner.

In some versions, the foot comprises an upper tab and a lower tab, the upper tab extending away from the disk for a first distance and the lower tab extending away from the disk for a second distance, the second distance being greater than the first distance.

Most preferably, the accessory connector comprises a connector height between the hook and the lower tab, and the container comprises a container height from the base to the rim, the connector height being substantially equal to the container height.

In preferred examples, the substantially planar surface is in contact with the outer surface of the sidewall when the accessory connector is attached to the cart.

BRIEF DESCRIPTION OF THE DRAWINGS

Preferred and alternative examples of the present invention are described in detail below with reference to the following drawings.

FIG. 23 is a left side elevational view of the divided bin.

FIG. 24 is a right side elevational view of the divided bin.

DETAILED DESCRIPTION OF THE PREFERRED EMBODIMENT

Figure 1:
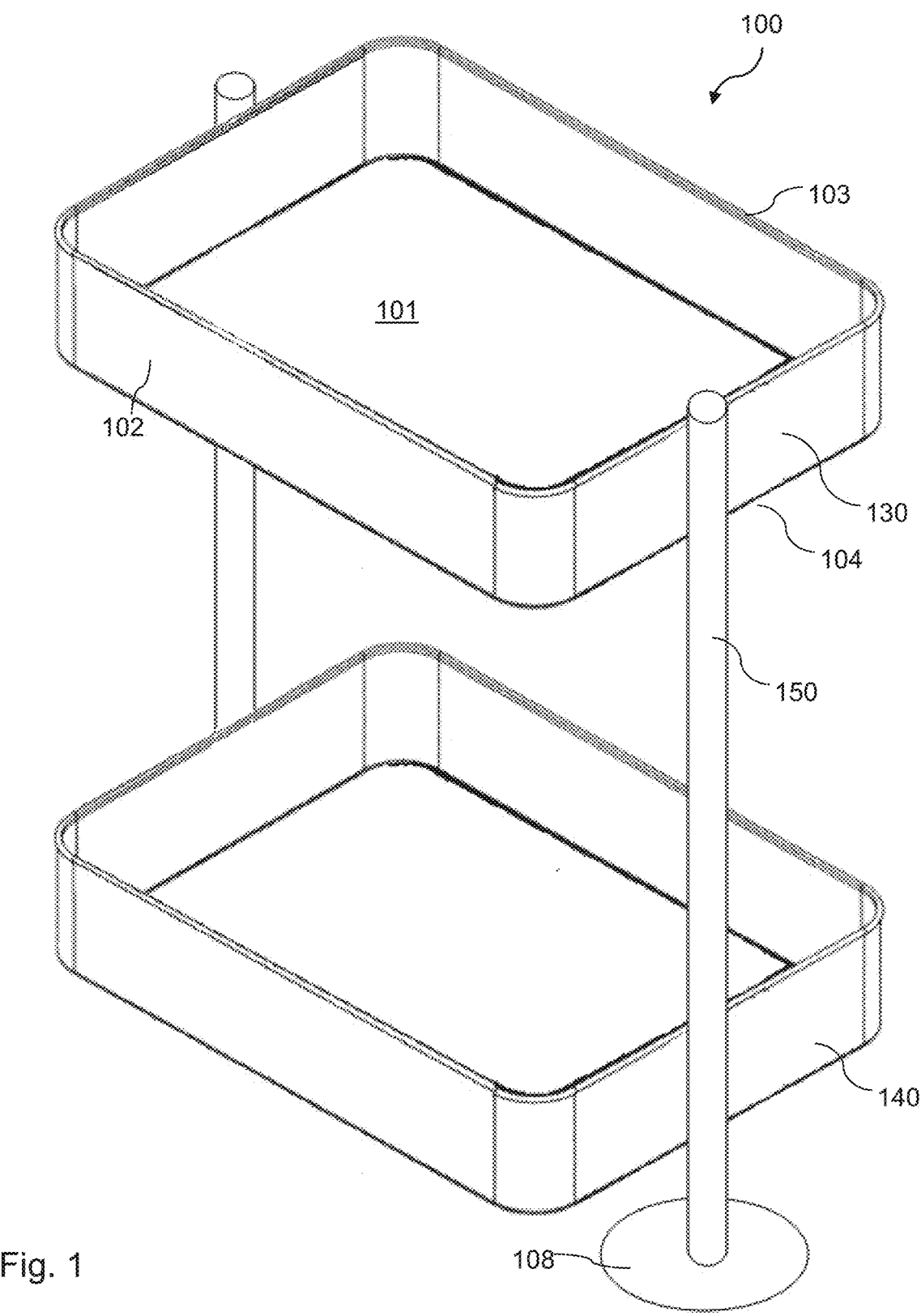
FIG. 1 is a front top perspective view of an exemplary cart having a plurality of containers for the attachment of one or more accessories.
Figure 2A:
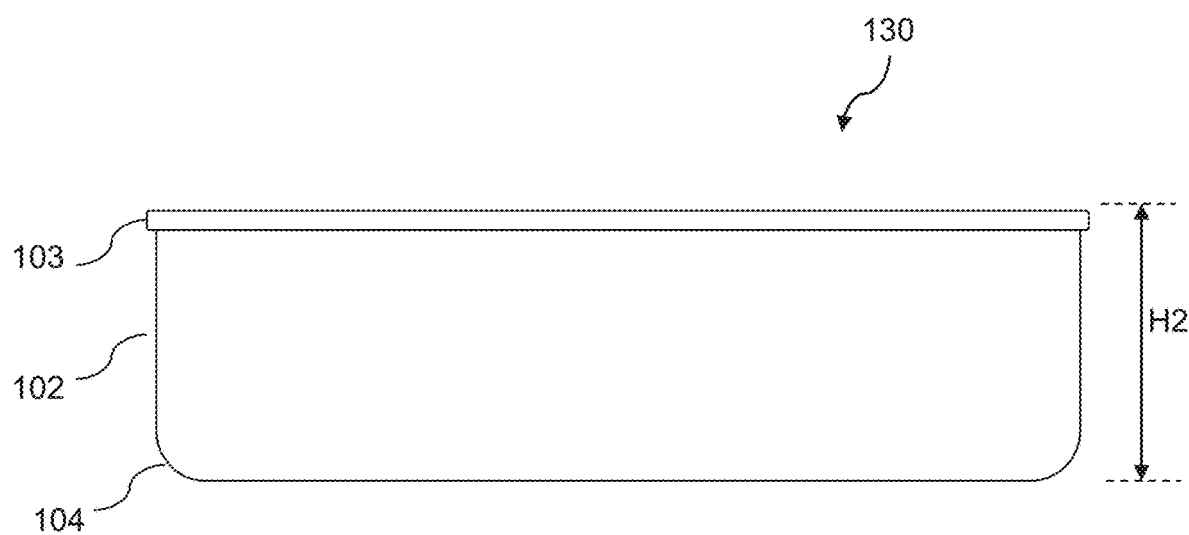
FIG. 2A is a front elevational view of one of the plurality of containers from FIG. 1.

An exemplary cart 100 having a plurality of containers 130, 140 is illustrated in isometric view in FIG. 1, with a single container 130 shown in front elevational view in FIG. 2A. In the illustrated example, the cart includes one or more containers 130, 140, each having a base 101 and peripheral sidewalls 102 extending upwardly to a rim 103, defining an interior space between the base and sidewalls. A bottom corner 104 is positioned at the intersection of the sidewall and the base, and in the illustrated example the bottom corner is rounded. The rim 103 of the container may have an enlarged or beaded finish. The cart optionally may include additional features such as handles interior dividers. In one version, the cart has one or more pillars 150 providing a support structure for multiple containers (for example, two or more) to be positioned above one another. A base or pedestal 108 provides a platform for the cart on a floor or other surface. In some versions, the pedestal is in the nature of a foot as illustrated, while in other versions the pedestal includes wheels or casters so that the cart may be freely rolled or wheeled from one location to another as desired.

In some instances, it may be useful to carry additional items with the cart, or to hang them from the cart, even though the interior of the cart may be full. In such a case, it may be desirable to have a connector for additional accessories which may be supported by or carried by the cart. As illustrated in FIGS. 3-42, a preferred accessory connector includes one or more upper hooks, a lower foot which may be in the form of upper and lower tabs, and a disk forming an intermediate surface which is preferably planar.

FIGS. 3-10 depict a preferred roll holder, in which the roll holder 300 includes an accessory connector 200 and a lower bar 310 for holding a rolled item such as a roll of paper towels. In one example, with reference to FIG. 4, the accessory connector includes a disk 210 which is preferably planar and which, in the preferred version, has an oblong perimeter. The accessory connector 200 includes one or more upper hooks 220, 221 and a lower foot 230. In the preferred example, the lower foot includes an upper laterally extending tab 231 and a lower laterally extending tab 232, in which the lower tab is longer and thereby extends farther away from the disk than the upper tab.

Figure 2B:
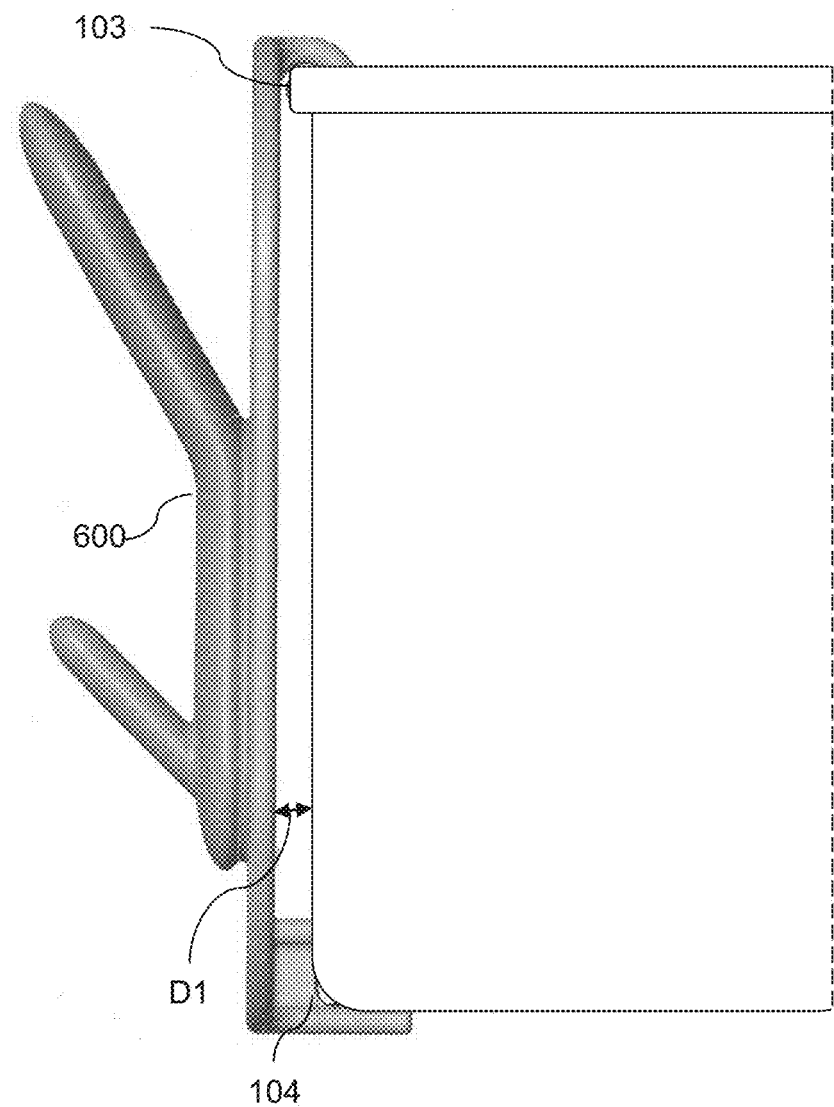
FIG. 2B is a front elevational view of the container of FIG. 2A, shown in partial cutaway and with an accessory attached.
Figure 3:
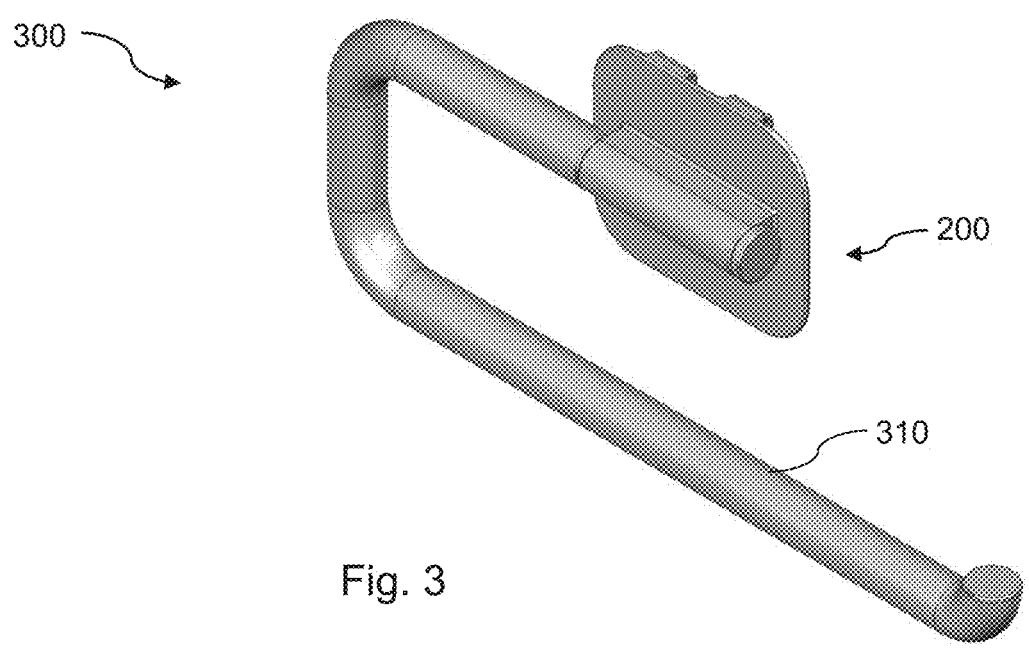
FIG. 3 is a front top isometric view of a preferred roll holder.
Figure 4:
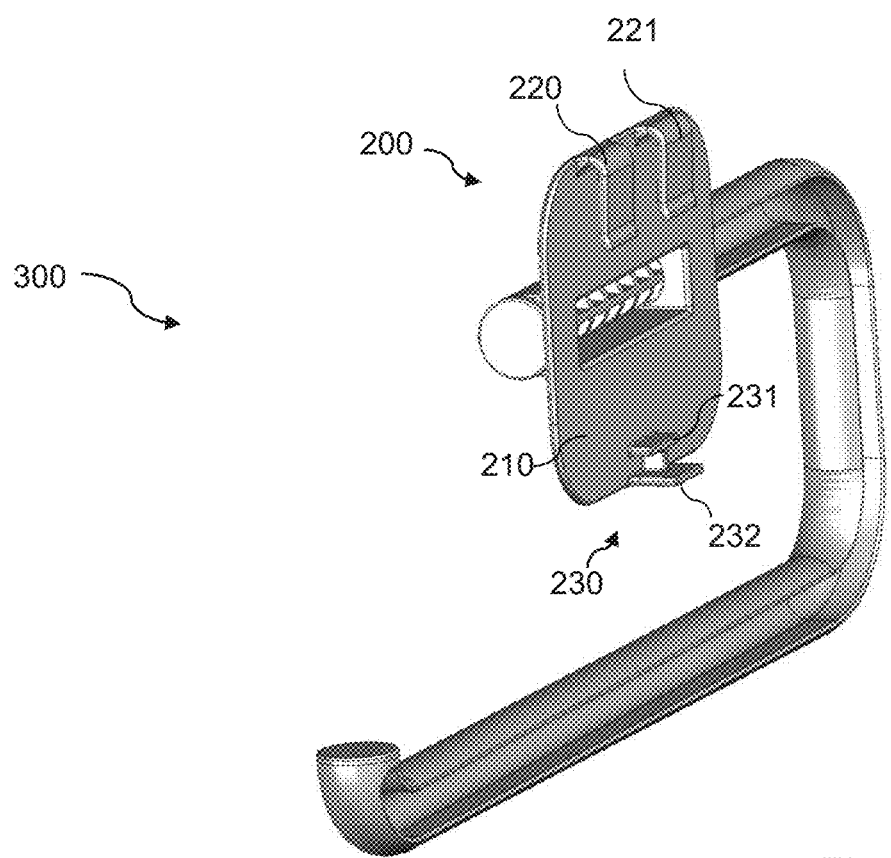
FIG. 4 is a rear top perspective view of the roll holder.
Figure 5:
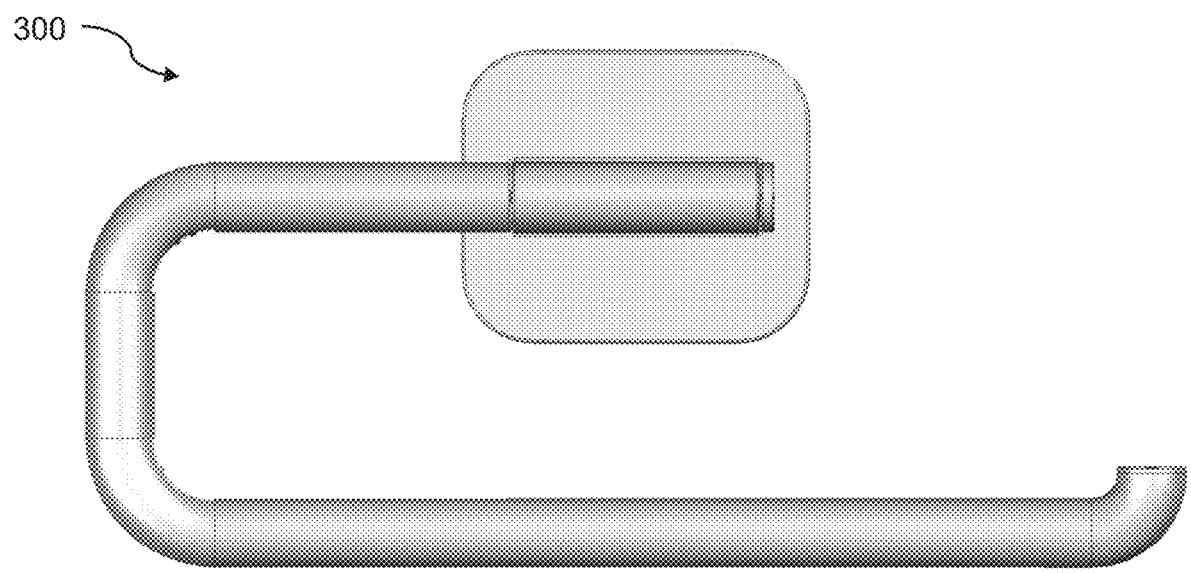
FIG. 5 is a front elevational view of the roll holder.
Figure 6:
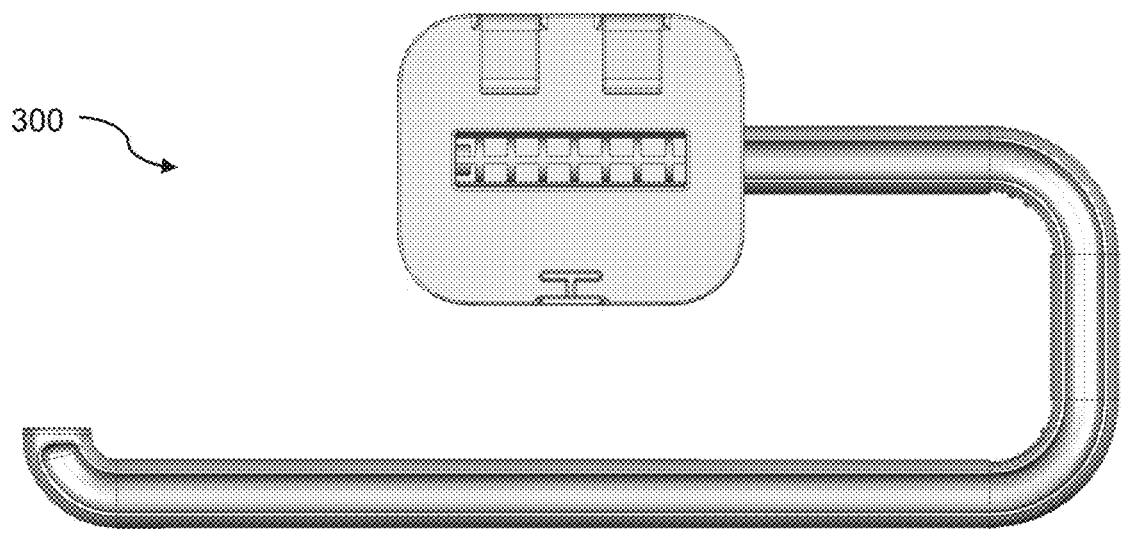
FIG. 6 is a rear elevational view of the roll holder.
Figures 7, 8:
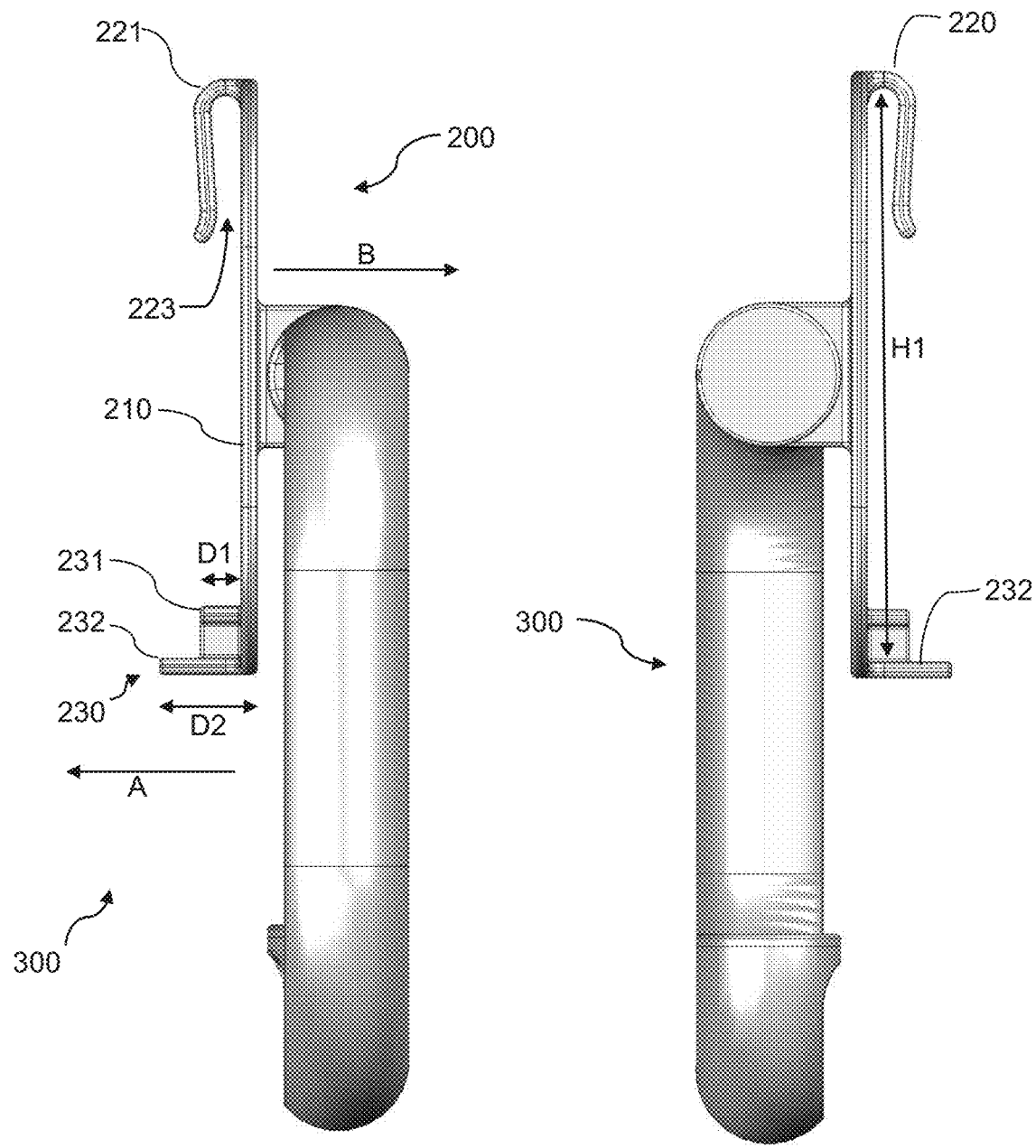
FIG. 7 is a left side elevational view of the roll holder.
FIG. 8 is a right side elevational view of the roll holder.
Figure 9:
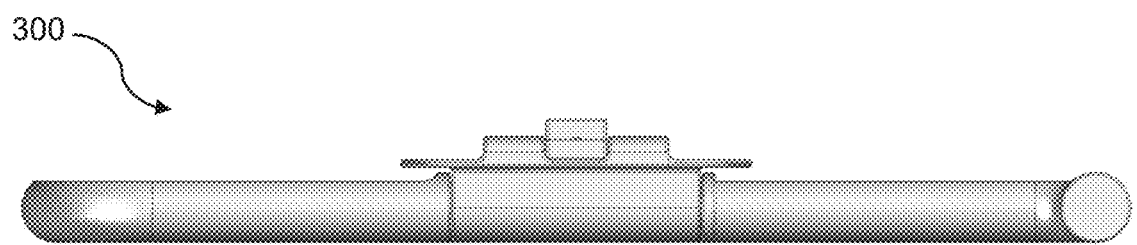
FIG. 9 is a top plan view of the roll holder.
Figure 10:
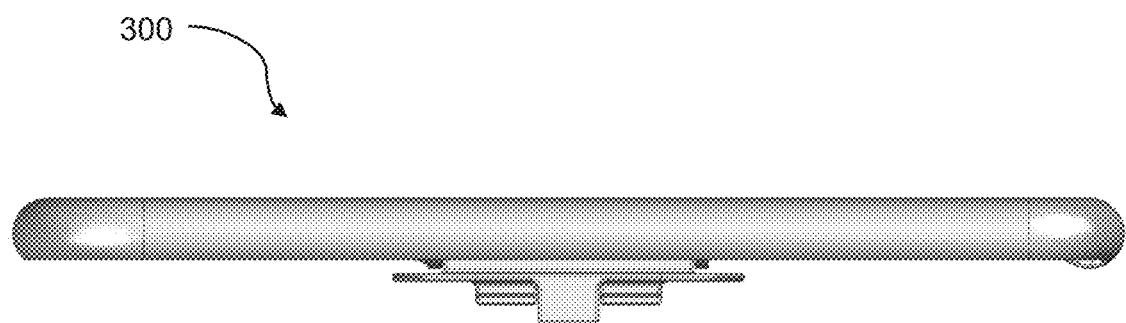
FIG. 10 is a bottom plan view of the roll holder.
Figure 11:
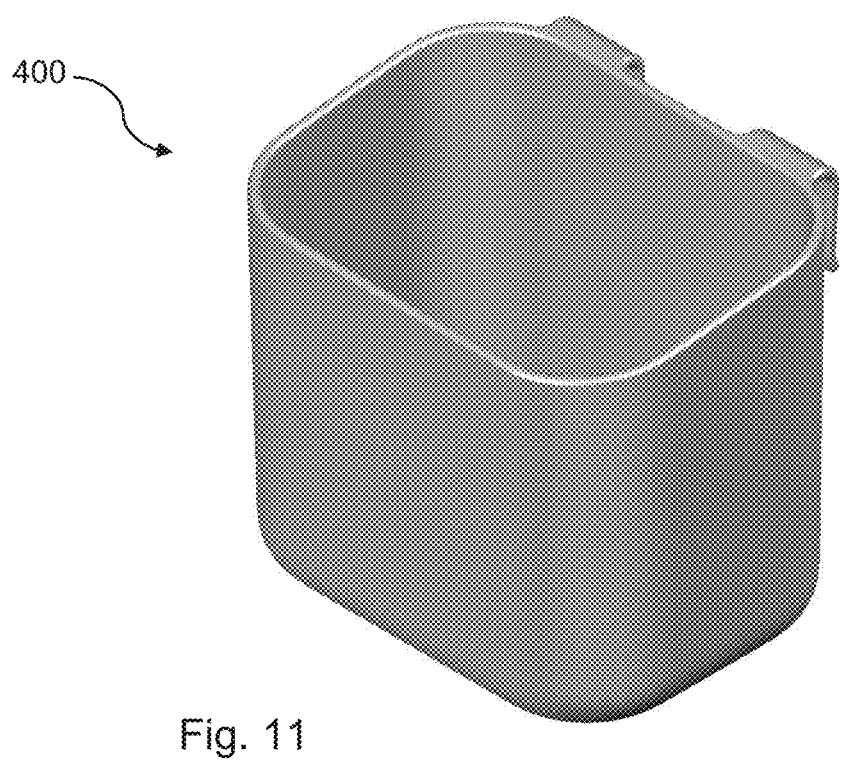
FIG. 11 is a front top isometric view of a preferred bin.
Figure 12:
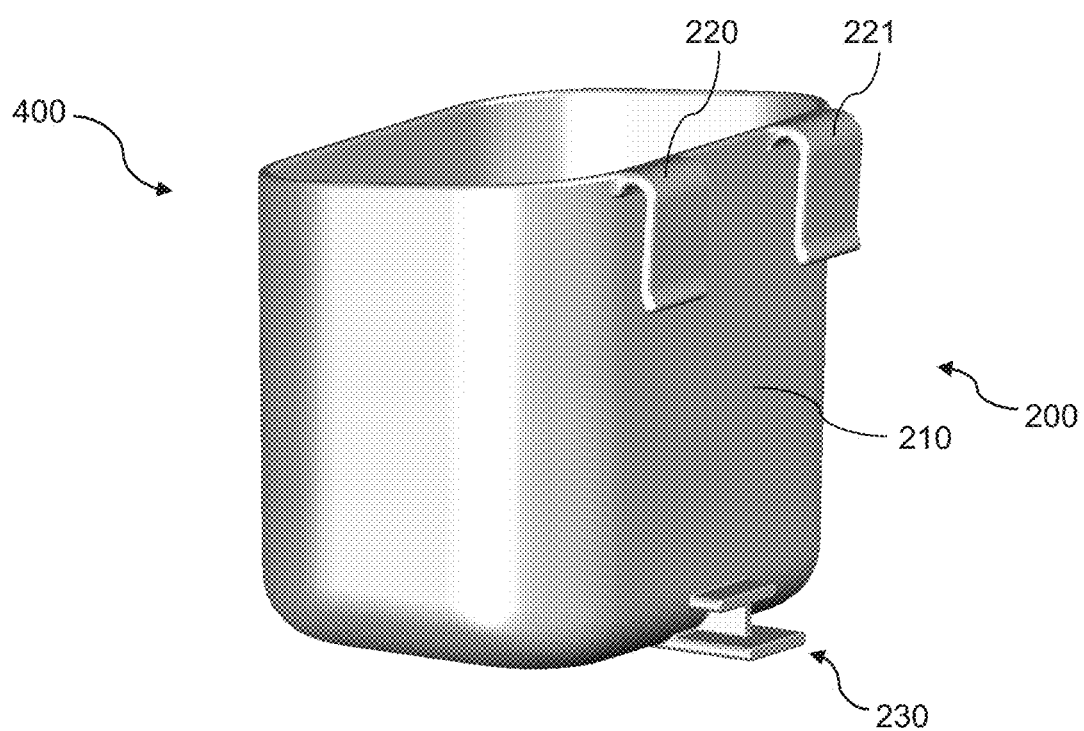
FIG. 12 is a rear top perspective view of the bin.
Figure 13:
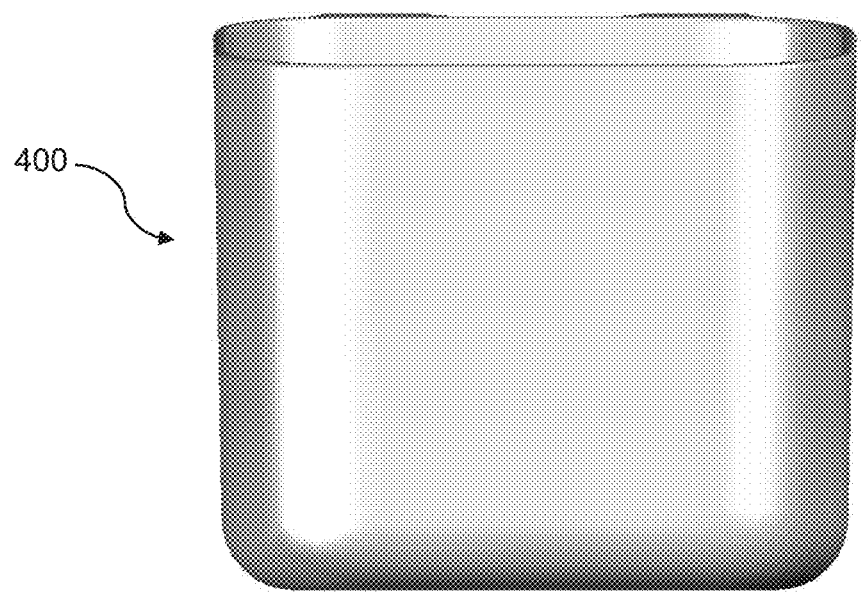
FIG. 13 is a front elevational view of the bin.
Figure 14:
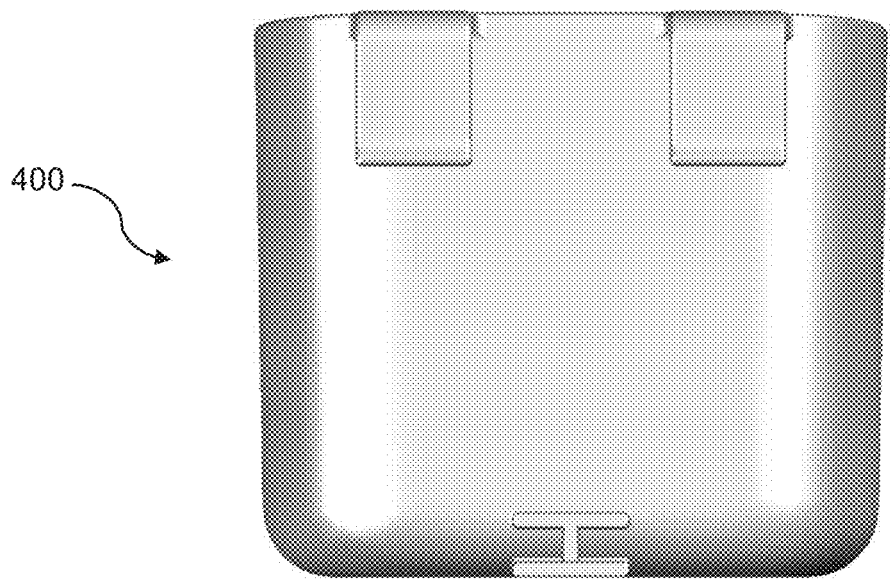
FIG. 14 is a rear elevational view of the bin.
Figure 15:
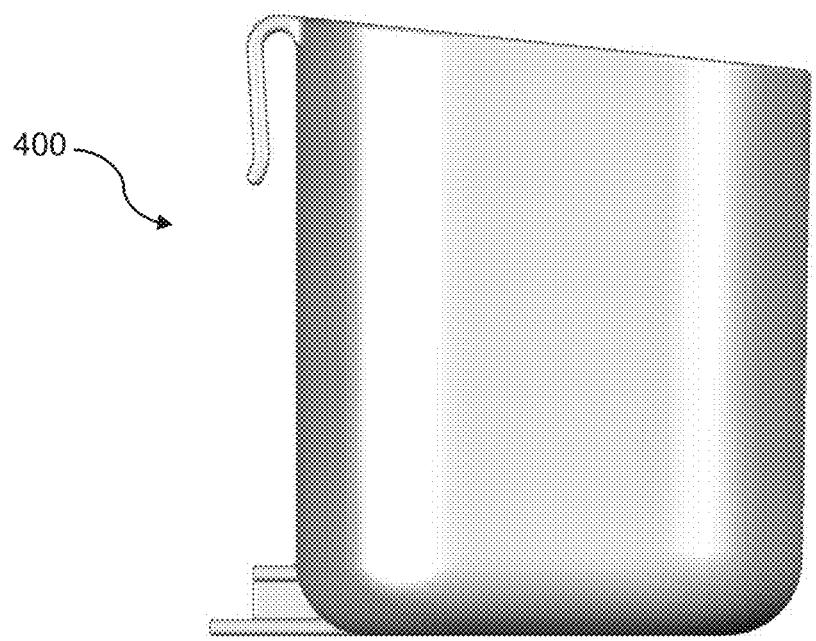
FIG. 15 is a left side elevational view of the bin.
Figure 16:
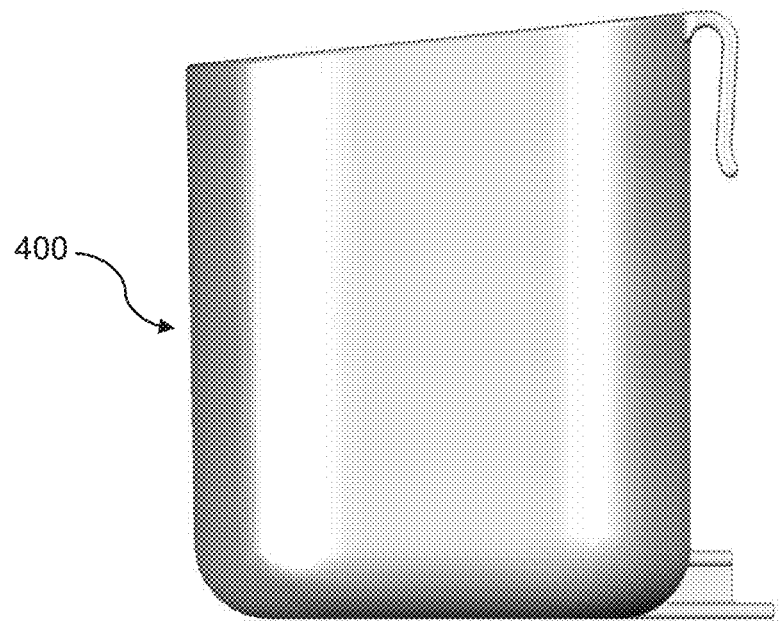
FIG. 16 is a right side elevational view of the bin.
Figure 17:
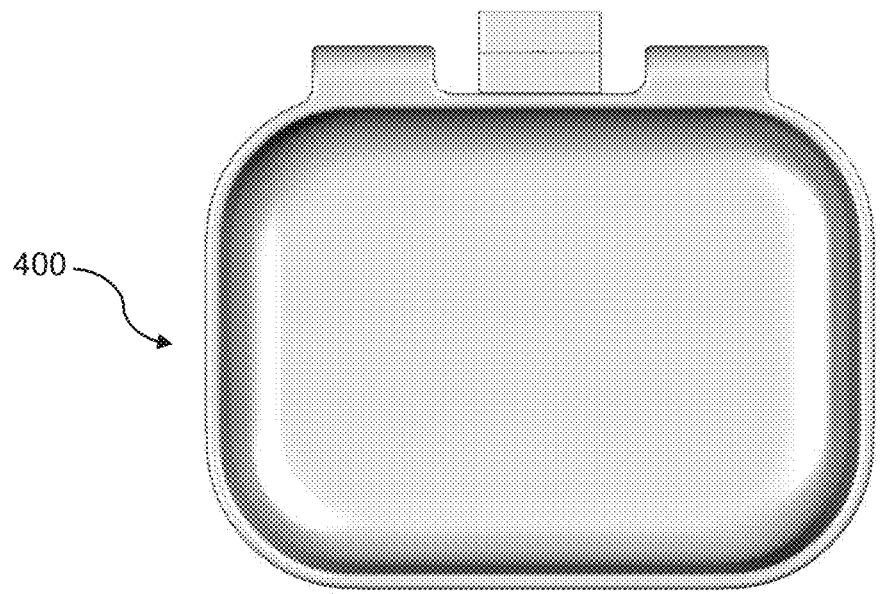
FIG. 17 is a top plan view of the bin.
Figure 18:
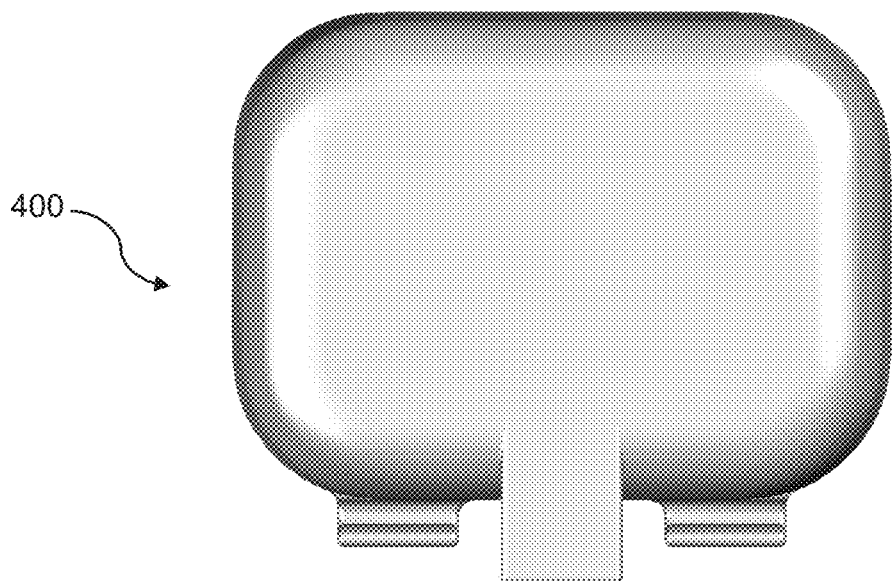
FIG. 18 is a bottom plan view of the bin.
Figure 19:
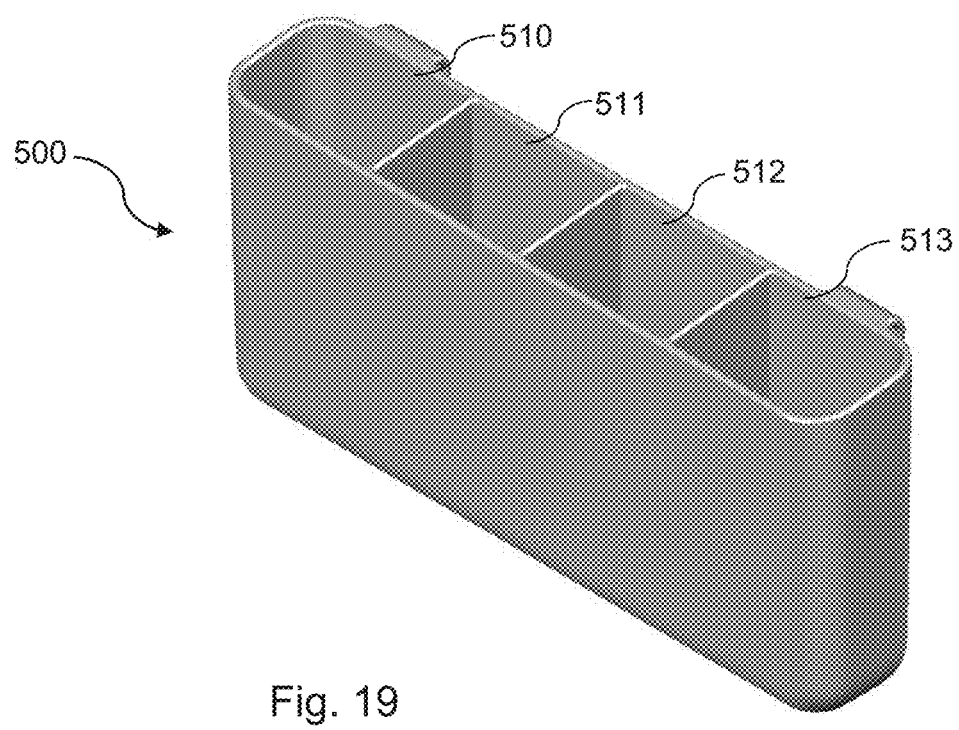
FIG. 19 is a front top isometric view of a preferred divided bin.
Figure 20:
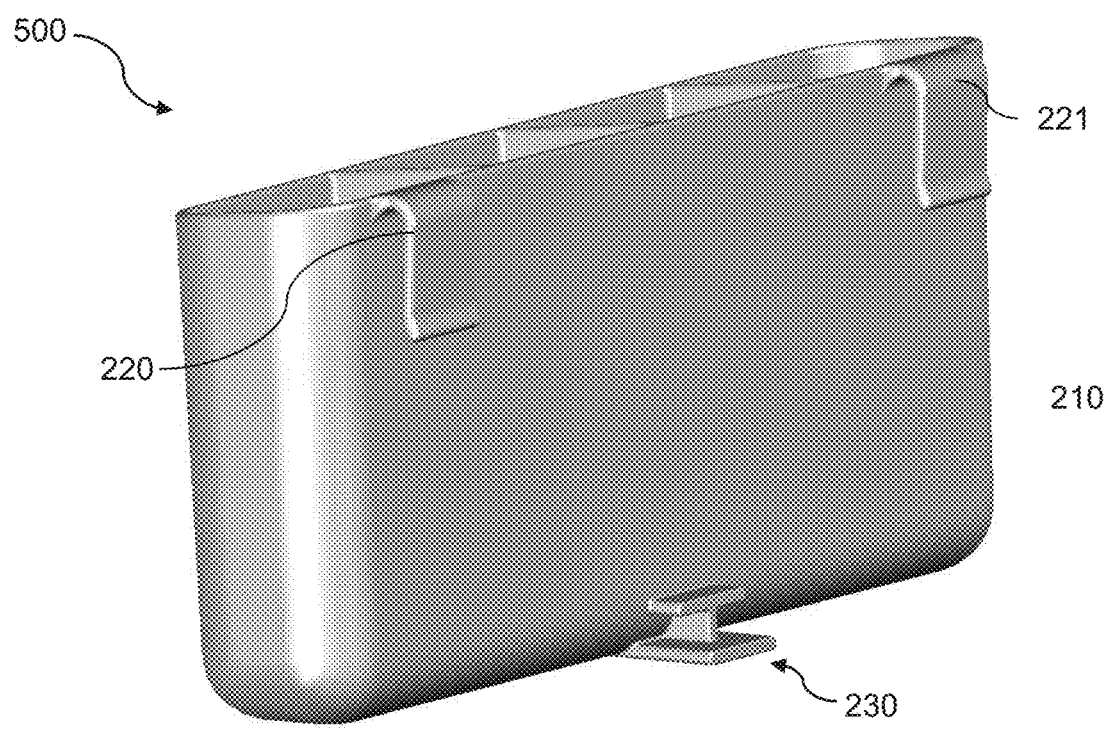
FIG. 20 is a rear top perspective view of the divided bin.
Figure 21:
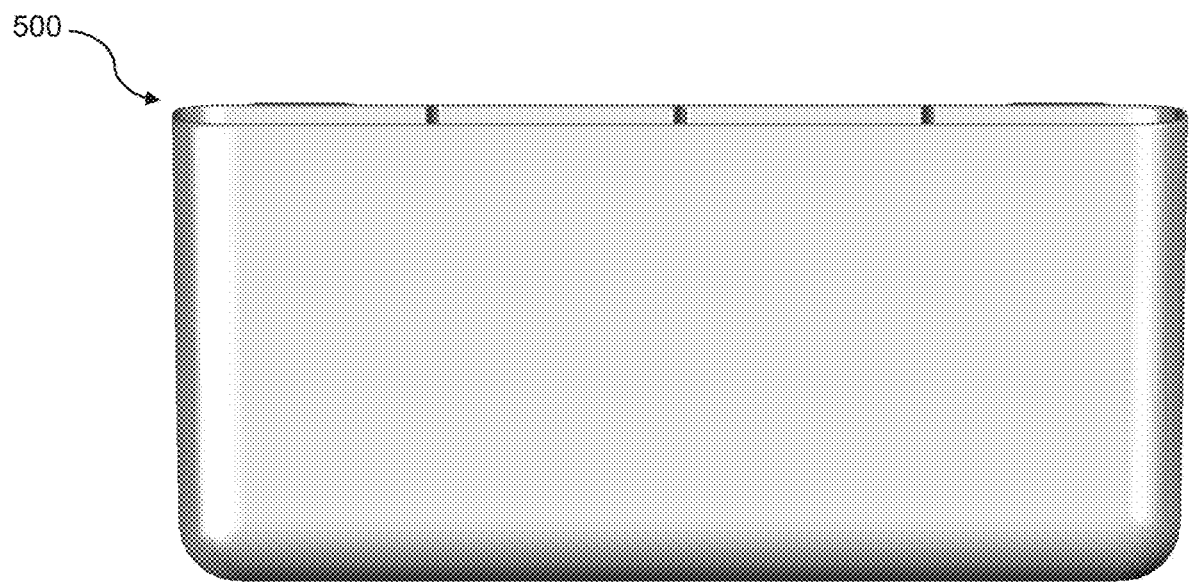
FIG. 21 is a front elevational view of the divided bin.
Figure 22:
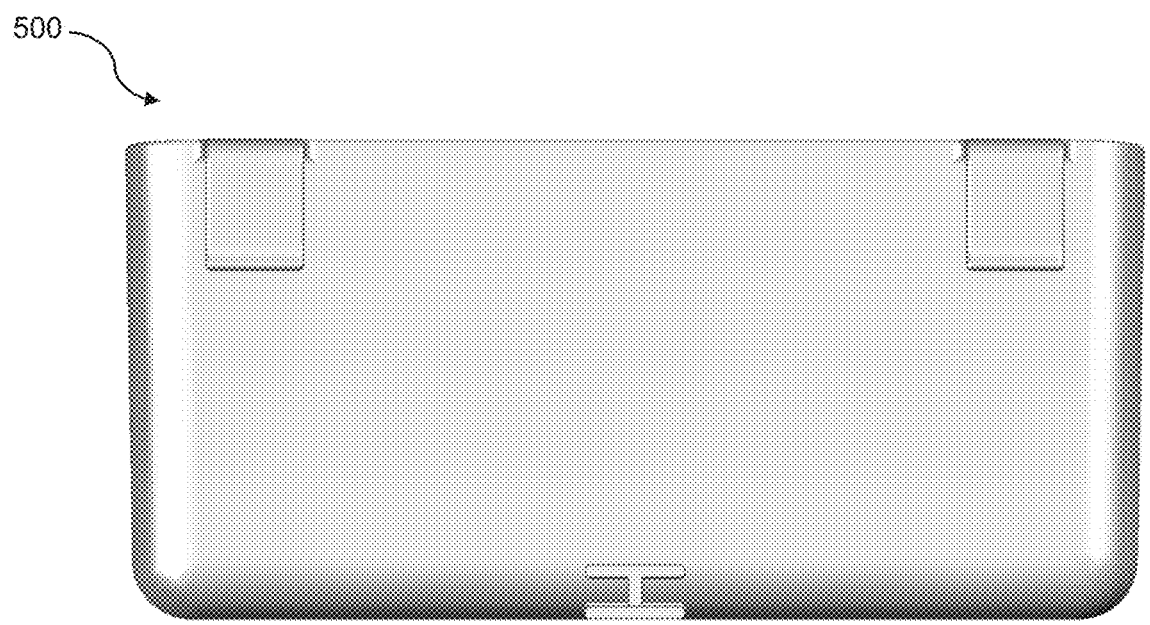
FIG. 22 is a rear elevational view of the divided bin.
Figure 25:
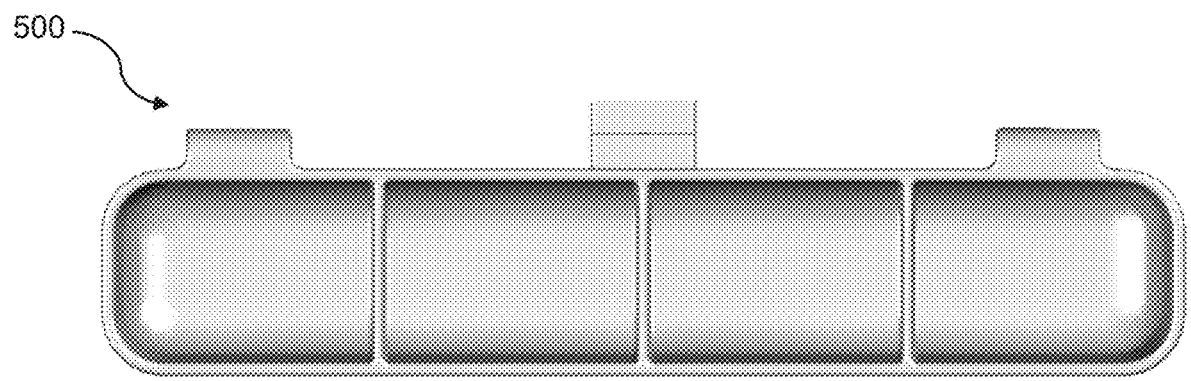
FIG. 25 is a top plan view of the divided bin.
Figure 26:
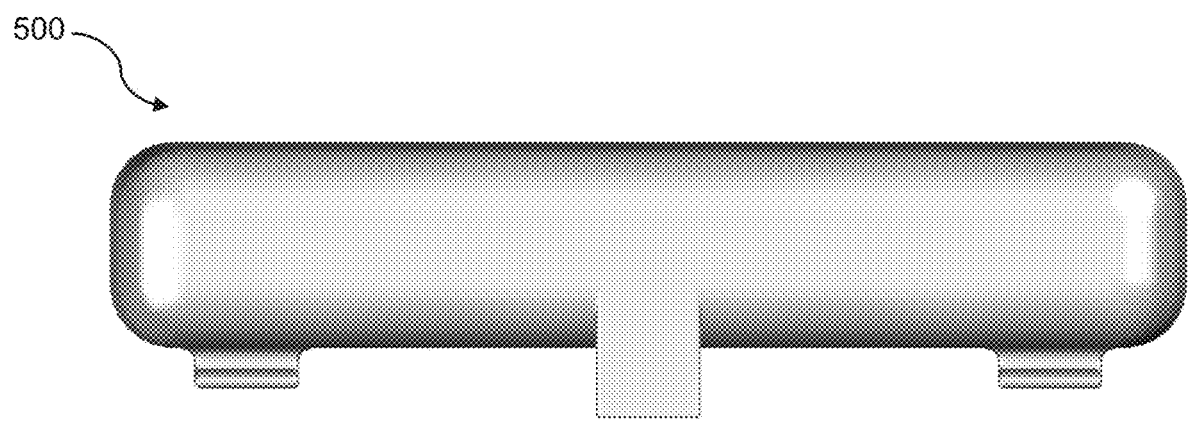
FIG. 26 is a bottom plan view of the divided bin.
Figure 27:
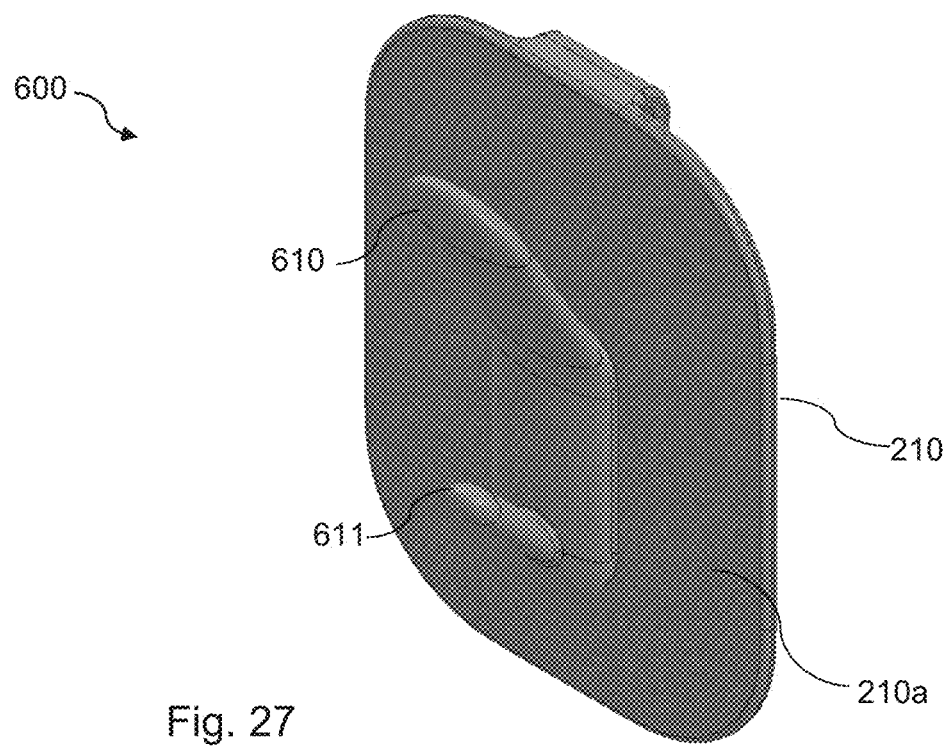
FIG. 27 is a front top isometric view of a preferred plate with hooks.
Figure 28:
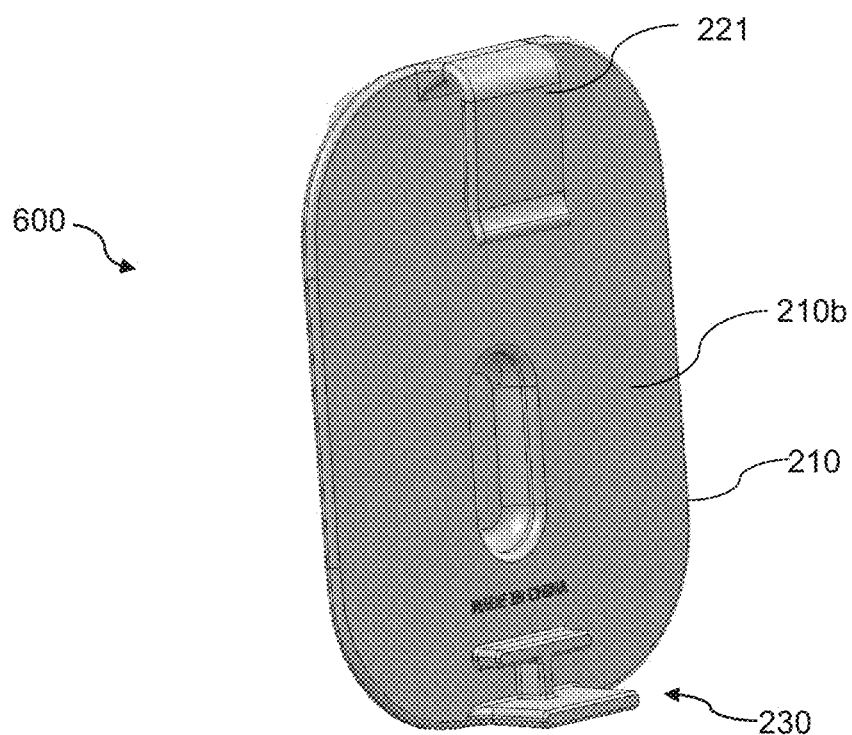
FIG. 28 is a rear top perspective view of the plate with hooks.
Figure 29:
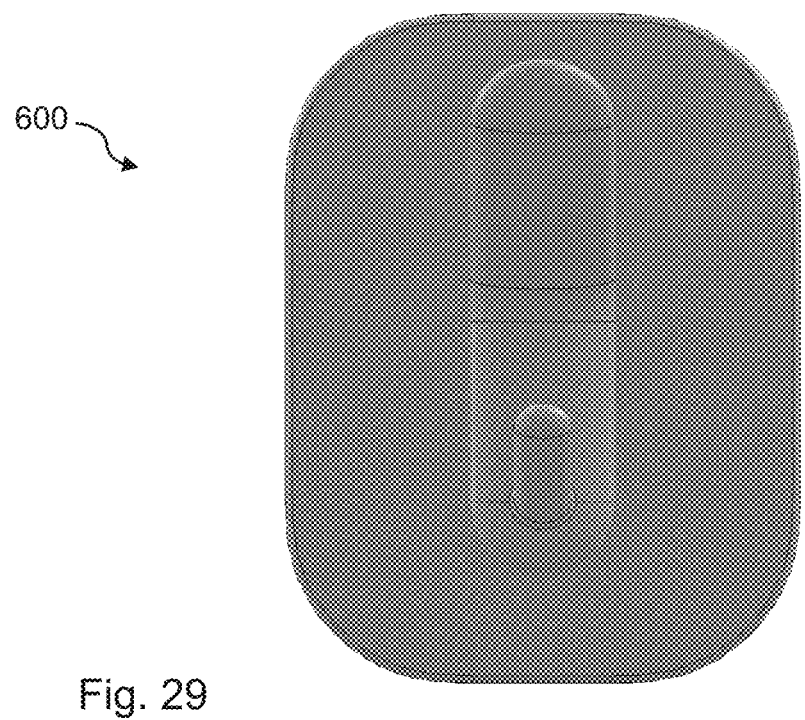
FIG. 29 is a front elevational view of the plate with hooks.
Figure 30:
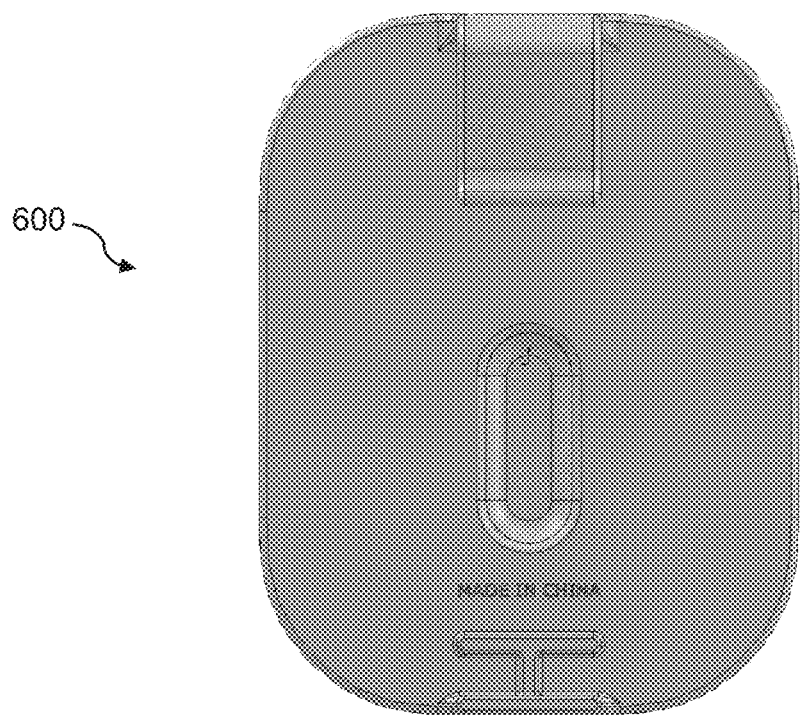
FIG. 30 is a rear elevational view of the plate with hooks.
Figures 31, 32:
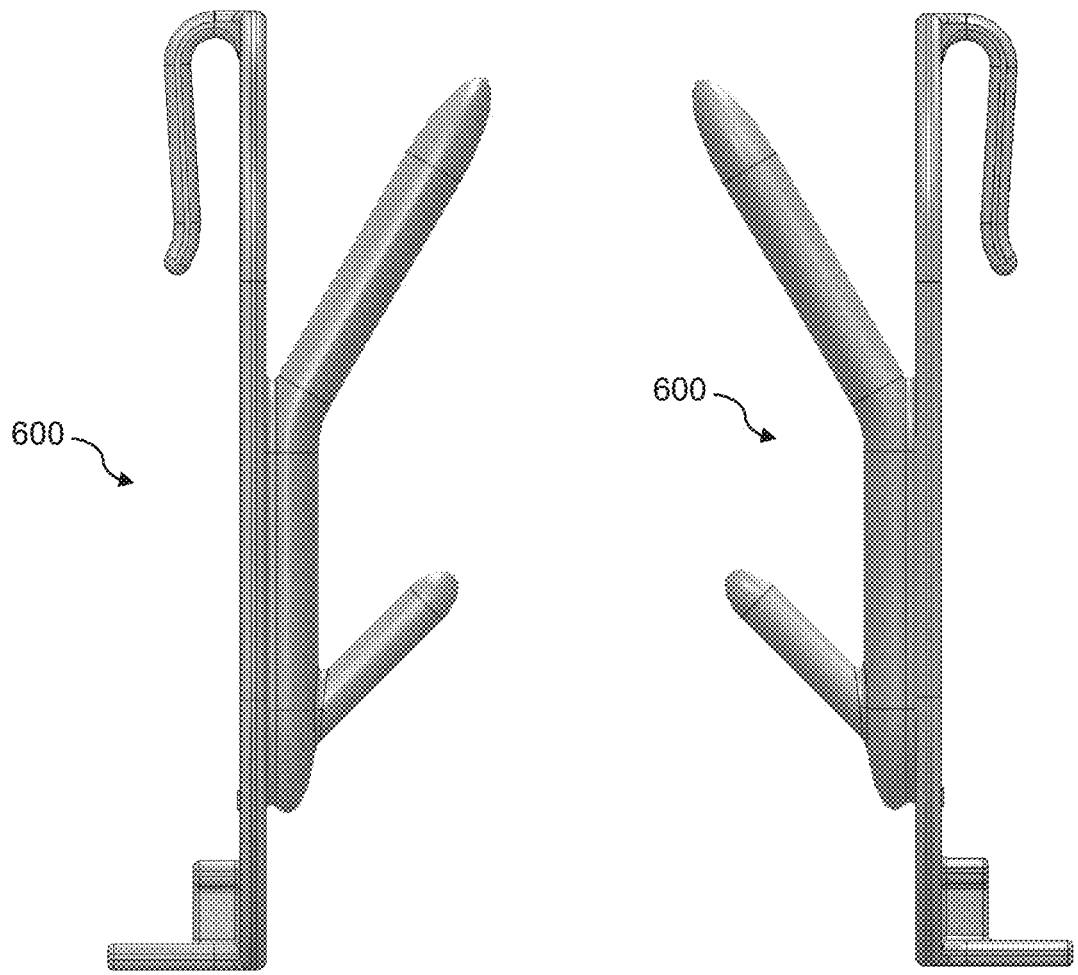
FIG. 31 is a left side elevational view of the plate with hooks.
FIG. 32 is a right side elevational view of the plate with hooks.
Figure 33:
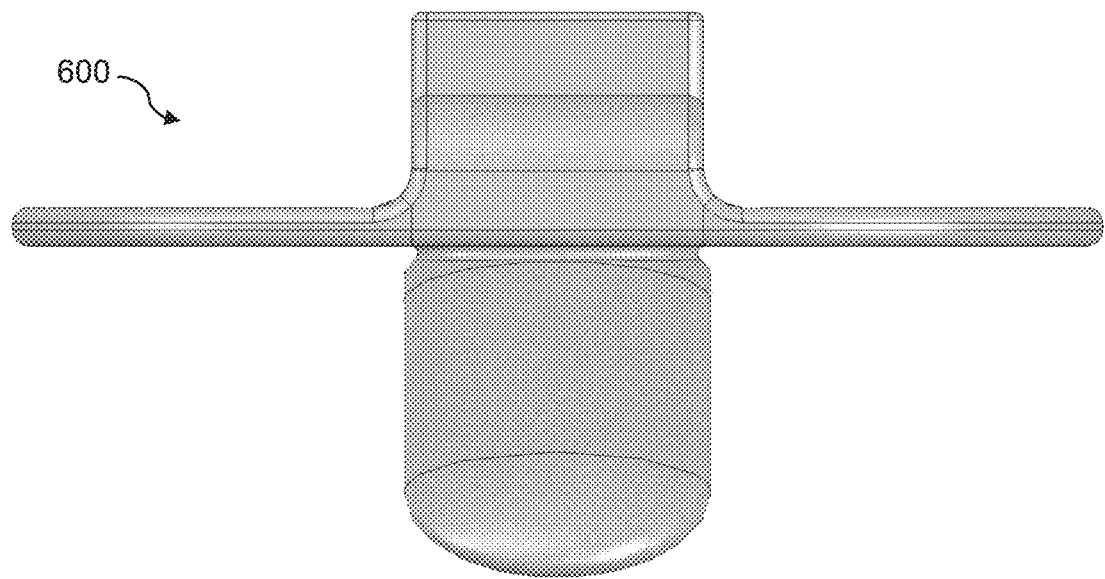
FIG. 33 is a top plan view of the plate with hooks.
Figure 34:
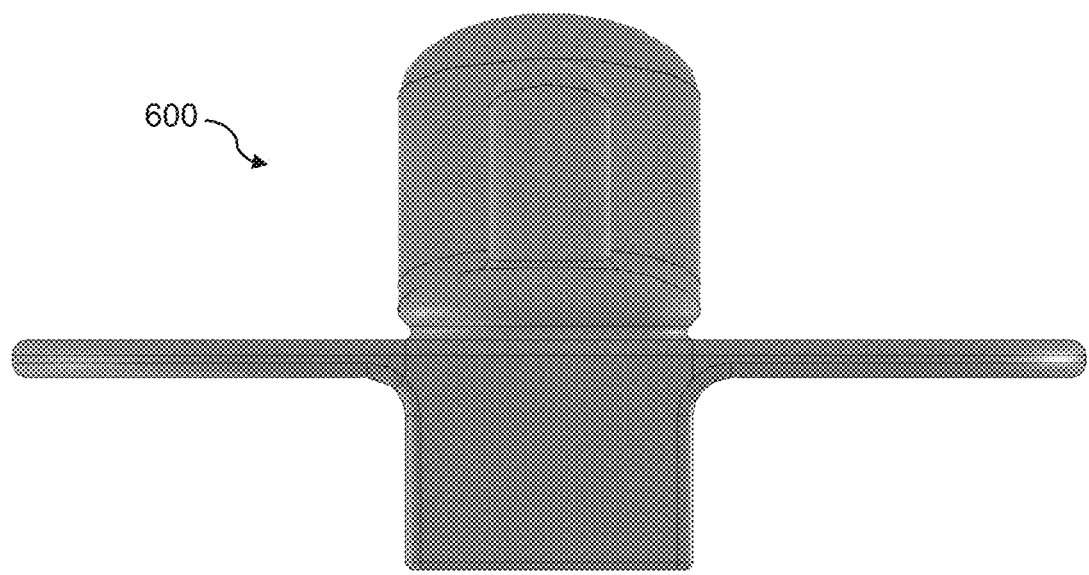
FIG. 34 is a bottom plan view of the plate with hooks.
Figure 35:
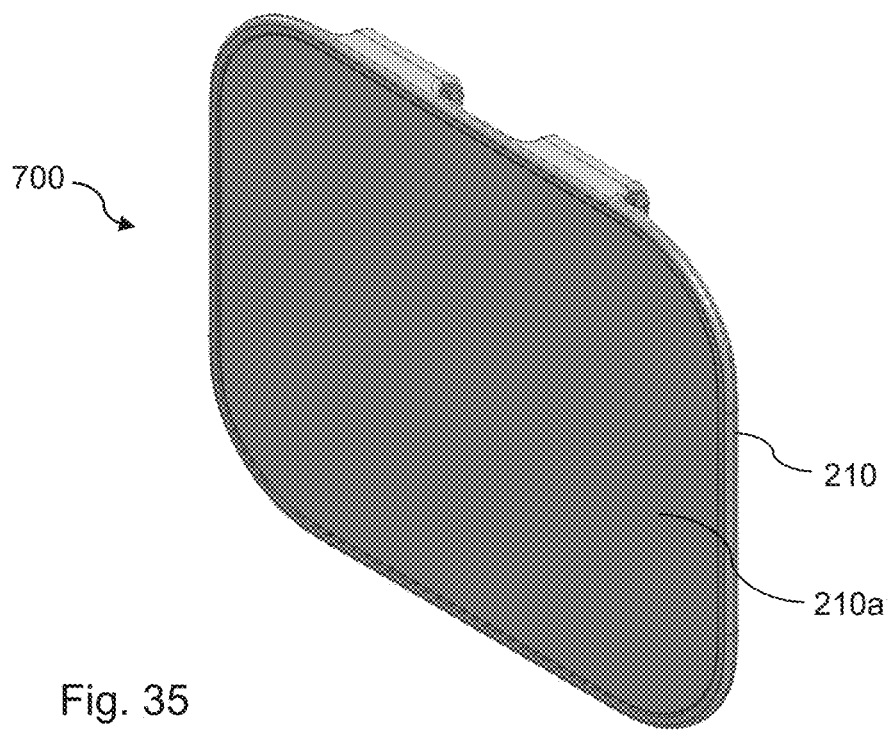
FIG. 35 is a front top isometric view of a tag plate.
Figure 36:
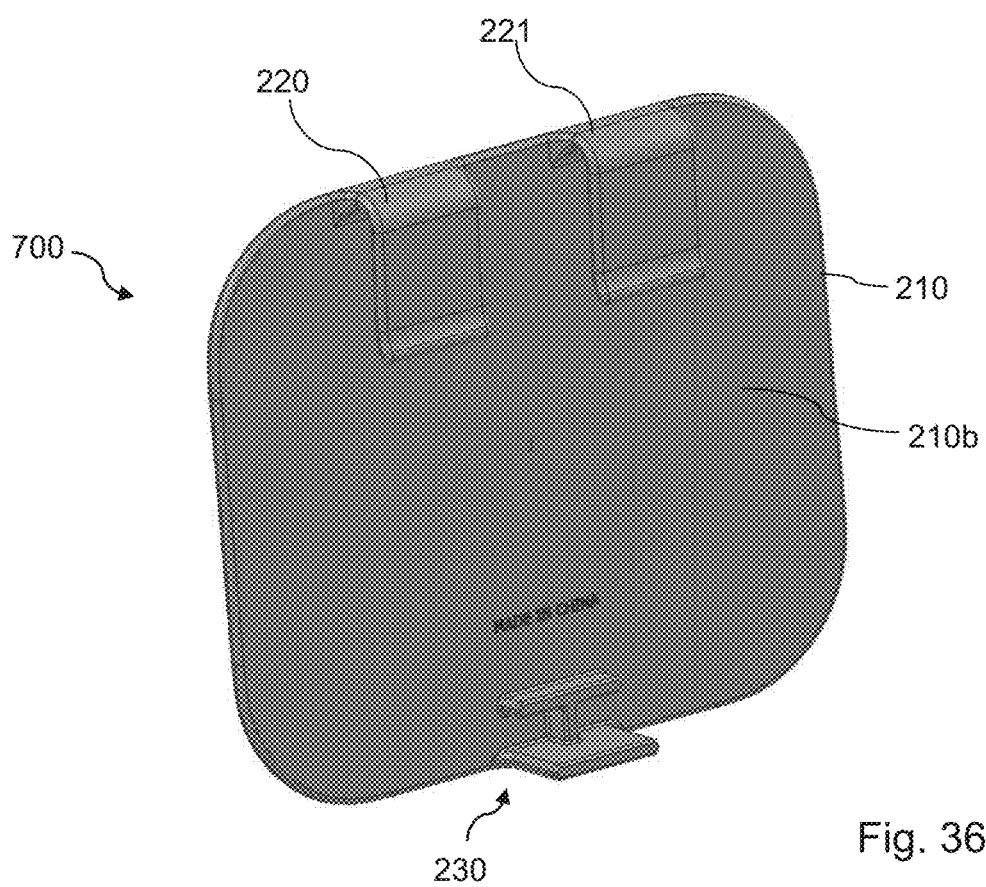
FIG. 36 is a rear top perspective view of the tag plate.
Figure 37:
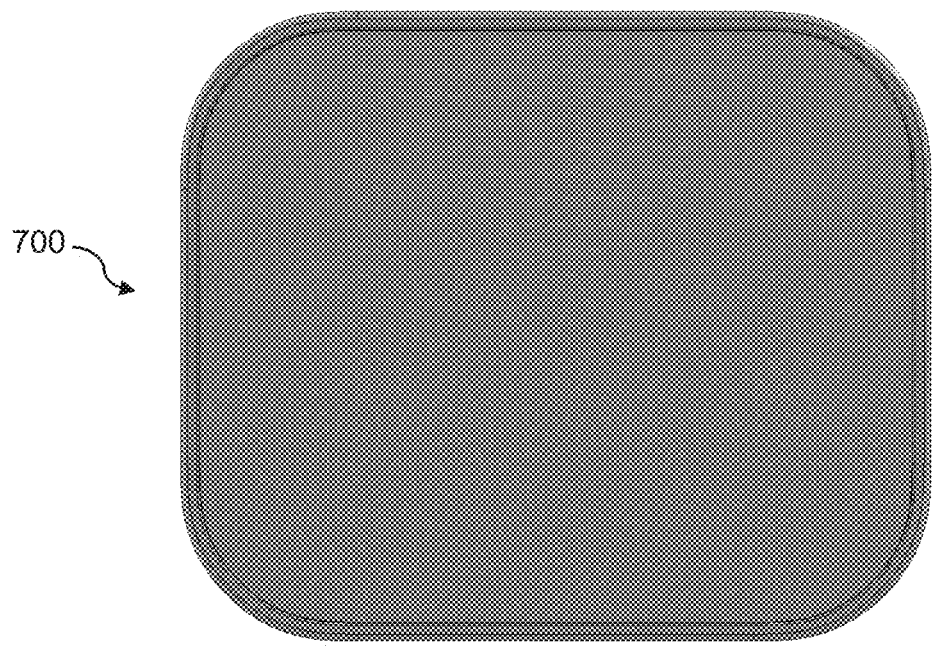
FIG. 37 is a front elevational view of the tag plate.
Figure 38:
FIG. 38 is a rear elevational view of the tag plate.
Figures 39, 40:
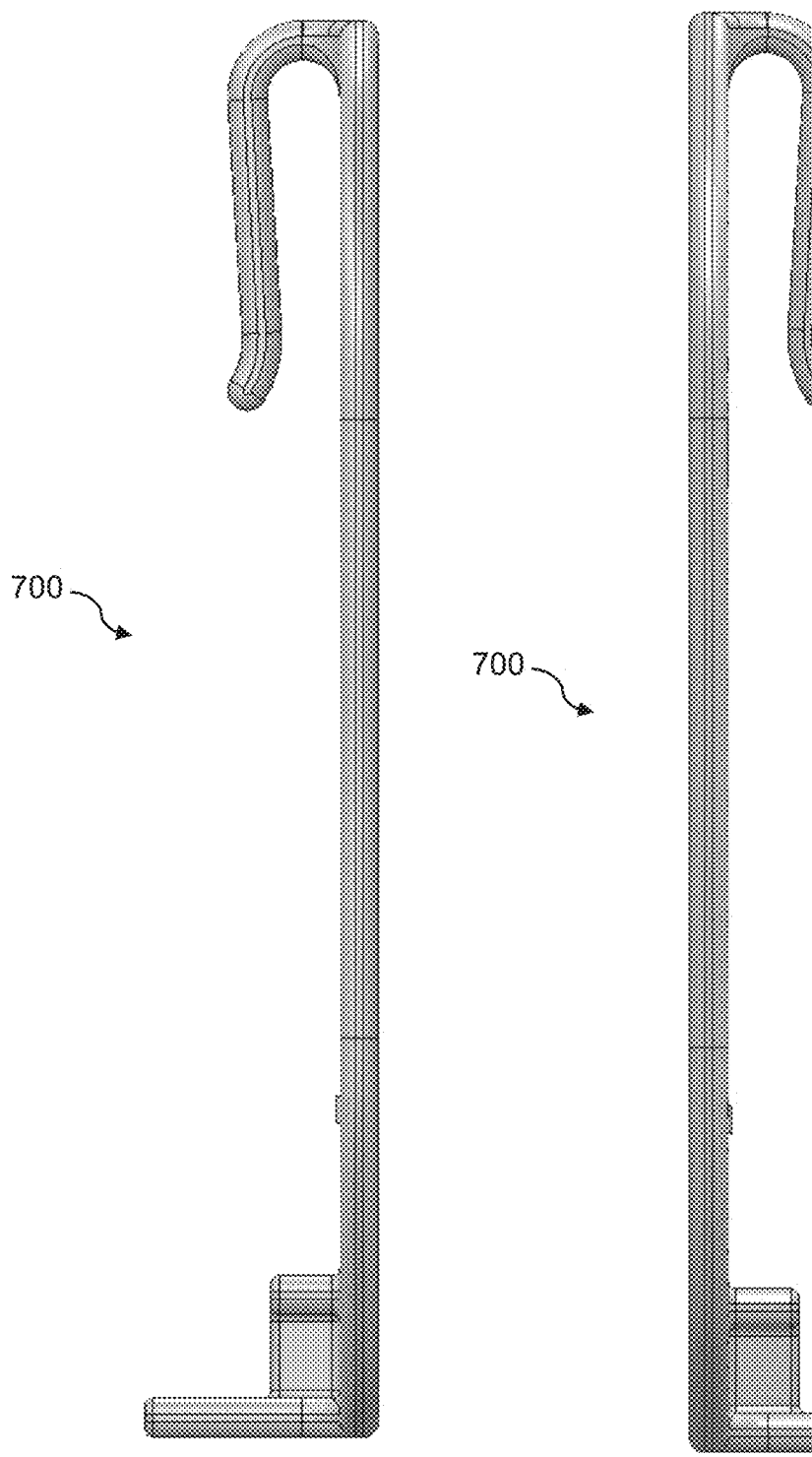
FIG. 39 is a left side elevational view of the tag plate.
FIG. 40 is a right side elevational view of the tag plate.
Figure 41:
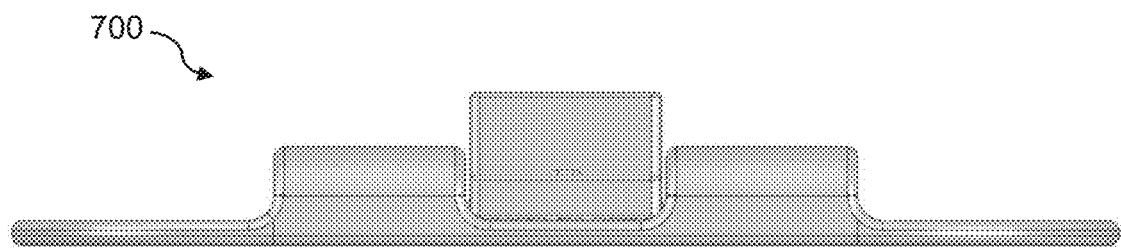
FIG. 41 is a top plan view of the tag plate.
Figure 42:
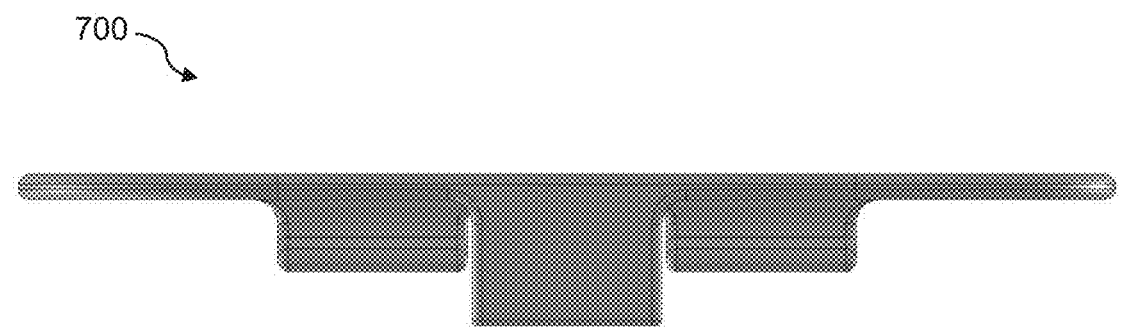
FIG. 42 is a bottom plan view of the tag plate

The same accessory connector 200 attached to the roll holder 300 is illustrated in a left side elevational view in FIG. 7 and the right side elevational view in FIG. 8. As best seen in these side views, the one or more hooks (such as hook 221) define a channel 223 between the hook and the disk 210. The lower foot includes an upper tab 231 as described above, in which the upper tab 231 extends a distance D1 laterally away from the disk, on the same side of the disk as the hook. A lower tab 232 extends laterally away from the disk in the same direction (see direction arrow A) but for a larger distance D2 which, in one example, is twice as long as D1. The accessory (in this case, the roll holder) extends away from the accessory connector in an opposite direction (that is, in the direction of arrow B). Most preferably, the upper tab 231 will engage the sidewall of the container and serve to maintain a distance D1 between the container sidewall and the disk 210, or similar surface of the accessory, along the entire height of the sidewall, as seen in FIG. 2B. This serves to maintain a parallel relationship between the accessory and the container sidewall, such that a plane defined by and extending through the disk is parallel to a plane defined by the sidewall of the container to which the accessory is attached.

The roll holder 300 may be attached to the cart by inserting the upper rim 103 of the cart into the channel 223 of the hook 221 so that the hook will secure the disk (and thereby the roll holder) to the cart. The rear planar surface of the disk will be adjacent the planar sidewall of the cart. The lower foot 230 engages and is in contact with the lower rounded corner of the cart, with the lower tab 232 extending to the bottom of the cart. Most preferably, a connector height H1 is defined between an interior surface of the channel of the hook 221 and the lower tab 232, in which the connector height H1 (see FIG. 8) is the same as a cart height H2 (see FIG. 2) extending from the bottom of the cart to the rim of the cart. In this fashion, the accessory connector 200 will snugly receive the sidewall of the cart when it is attached to the cart, firmly securing the accessory connector to the sidewall of the cart.

An array of additional accessories may be attached to a cart in the manner described above, using an accessory connector as shown and described. Examples include a bin as shown in FIGS. 11-18, a divided bin (having dividers forming interior compartments) as shown in FIGS. 19-26, a plate with hooks as shown in FIGS. 27-34, and a tag plate as shown in FIGS. 35-42. Yet other accessories may also be coupled to an accessory connector, beyond those in the accompanying illustrations.

In the preferred version of the bin 400 as shown in FIGS. 11-18, the accessory connector is integrated into the bin, such that the disk 210 is integrally formed with a sidewall of the bin. In this illustrated version, a pair of hooks 220, 221 is provided, positioned at an upper end of the bin and spaced apart from one another. A lower foot 230 is positioned at the bottom of the bin. Aside from being integrally formed into the outer sidewall of the bin, the accessory connector of FIGS. 11-18 is otherwise configured in the same fashion as that of FIGS. 3-10, with the same dimensional relationships.

A preferred divided bin 500 is shown in FIGS. 19-26. The preferred divided bin includes multiple interior bin compartments, and in this illustrated example four such compartments 510-513 are shown. As with the single bin 400, the accessory connector is integrated into the bin, such that the disk 210 is integrally formed with a rear sidewall of the bin. In this illustrated version, a pair of hooks 220, 221 is provided, positioned at an upper end of the bin and spaced apart from one another. A lower foot 230 is positioned at the bottom of the bin. Aside from being integrally formed into the outer sidewall of the bin, the accessory connector of FIGS. 19-26 is otherwise configured in the same fashion as that of FIGS. 3-10, with the same dimensional relationships.

A preferred plate with hooks is shown in FIGS. 27-34. The preferred plate with hooks includes a disk 210 or plate, having a front side 210a (see FIG. 27) and a back side 210b (see FIG. 28). The front side 210a is configured with one or more hooks, including a pair of hooks 610, 611 in the illustrated example. The back side 210b is configured as an accessor connector in the manner as described above. The disk 210 is formed on the back side of the plate. In this illustrated version, a single hook 221 is provided, positioned at an upper end of the plate. A lower foot 230 is positioned at the bottom of the plate. Aside from being formed on the rearward side of a plate having hooks, the accessory connector of FIGS. 27-34 is otherwise configured in the same fashion as that of FIGS. 3-10, with the same dimensional relationships.

As one additional example, a tag plate 700 is illustrated in FIGS. 35-42. Essentially, the tag plate 700 is structurally similar to the plate with hooks 600 except that there are no hooks in the tag plate, instead, the front side is substantially flat in order to accommodate the attachment of a sign or a label. The preferred tag plate includes a disk 210 or plate, having a front side 210a (see FIG. 35) and a back side 210b (see FIG. 36). The front side 210a is formed with a substantially flat face in the illustrated example so that a tag or label may be attached or adhered to it. The back side 210b is configured as an accessory connector in the manner as described above. The disk 210 is formed on the back side of the plate. In this illustrated version, a pair of hooks 220, 221 is provided, positioned at an upper end of the plate. A lower foot 230 is positioned at the bottom of the plate. Aside from being formed on the rearward side of a plate having hooks, the accessory connector of FIGS. 27-34 is otherwise configured in the same fashion as that of FIGS. 3-10, with the same dimensional relationships.

In use, any one or more of the above accessories may be attached to the exemplary cart in the manner as described above, thereby providing for a removable attachment of the accessories via the accessory connector as described and illustrated.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

I claim:

1. An accessory connector, comprising:
   a planar disk having an upper end and a lower end, a front side and a back side;
   a hook positioned at the upper end of the back side of the disk, the hook extending downward toward the lower end and defining a channel between the hook and the back side of the disk;
   a foot positioned at the lower end of the back side of the disk, and extending laterally away from the disk, the foot having an upper tab and a lower tab, the upper tab extending perpendicularly away from the disk for a first distance and the lower tab extending perpendicularly away from the disk for a second distance, the second distance being greater than the first distance; and
   an accessory positioned on the front side of the disk.

2. The accessory connector of claim 1, wherein the accessory comprises a roll holder.

3. The accessory connector of claim 1, wherein the accessory comprises one or more accessory hooks.

4. The accessory connector of claim 1, wherein the accessory comprises a bin.

5. The accessory connector of claim 4, wherein the bin is divided into multiple compartments.

6. The accessory connector of claim 1, wherein the accessory comprises a tag plate.

7. The accessory connector of claim 1, wherein the hook comprises a plurality of hooks.

8. The accessory connector of claim 1, further comprising a cart, the cart having a base and a sidewall extending upward to a rim, a corner being formed at the intersection of the base and the sidewall, wherein the accessory connector is removably attachable to the cart by connecting the hook to the rim by inserting the rim into the channel, and coupling the foot to the corner by engaging the upper tab with the sidewall of the cart and engaging the lower tab with the base of the cart.

9. The accessory connector of claim 8, wherein the sidewall comprises an inner surface and an outer surface, the accessory connector being removably attachable to the outer surface whereby when the accessory connector is attached to the cart, the disk is in contact with the outer surface of the sidewall.

10. An accessory connector for attaching an accessory to a container, the accessory connector comprising:
    a hook positioned at an upper end of the accessory connector and extending laterally away from the accessory connector in a first direction;
    a foot positioned at a lower end of the accessory connector and extending laterally away from the accessory connector in the first direction;
    a substantially planar surface extending between the hook and the foot, a channel being defined between the hook and the substantially planar surface; and
    an accessory attached to the accessory connector, the accessory extending away from the accessory connector in a second direction opposite to the first direction;
    the container having a base and a sidewall joining at a corner, the sidewall extending upwardly from the base and terminating in a rim, wherein the accessory connector is removably attachable to the container by inserting the rim into the channel formed by the hook and connecting the foot to the corner;
    wherein the foot comprises an upper tab and a lower tab, the upper tab extending away from the disk for a first distance and the lower tab extending away from the disk for a second distance, the second distance being greater than the first distance.

11. The accessory connector of claim 10, wherein the accessory connector comprises a connector height between the hook and the lower tab, and the container comprises a container height from the base to the rim, the connector height being substantially equal to the container height.

12. The accessory connector of claim 11, wherein the accessory comprises a bin.

13. The accessory connector of claim 12, wherein the bin is divided into multiple compartments.

14. The accessory connector of claim 11, wherein the accessory comprises a tag plate.

15. The accessory connector of claim 10, wherein the substantially planar surface is in contact with the outer surface of the sidewall when the accessory connector is attached to the cart.

* * * * *